United States Patent [19]

Gandrud et al.

[11] 4,172,537

[45] Oct. 30, 1979

[54] SPREADER FOR GRANULAR FERTILIZER AND CHEMICALS

[76] Inventors: Ebenhard S. Gandrud, P.O. Box 528; Dale E. Gandrud, 640 Cardinal Dr., both of Owatonna, Minn. 55060

[21] Appl. No.: 907,950

[22] Filed: May 22, 1978

[51] Int. Cl.$^2$ .............................................. B67D 5/52
[52] U.S. Cl. ................................. 222/135; 222/618; 222/625; 172/311; 172/662; 280/656; 280/411 B
[58] Field of Search .............. 222/609, 610, 618, 623, 222/624, 625, 614, 615, 616, 135; 172/311, 456, 662; 111/10; 280/411, 412, 413, 638, 639, 656

[56] References Cited

U.S. PATENT DOCUMENTS

| | | | |
|---|---|---|---|
| 2,558,352 | 6/1951 | Gandrud | 222/624 |
| 2,759,637 | 8/1956 | Gandrud | 222/135 |
| 2,929,634 | 3/1960 | Gandrud | 222/138 |
| 3,493,246 | 2/1970 | Tass et al. | 172/456 X |
| 3,493,247 | 2/1970 | Tass et al. | 172/456 X |
| 3,502,154 | 3/1970 | Rogers | 172/456 X |
| 3,791,673 | 2/1974 | Hornung | 172/456 X |
| 4,008,833 | 2/1977 | Gandrud | 222/178 |

Primary Examiner—Allen N. Knowles
Attorney, Agent, or Firm—Merchant, Gould, Smith, Edell, Welter & Schmidt

[57] ABSTRACT

An elongated mobile frame having supporting wheels at its rear end and a pair of elongated support arms pivotally secured at their inner ends to the rear end portion of the frame for movements between operative positions projecting transversely from the frame and forwardly projecting inoperative positions. The support arms have outer support wheels engaging the ground in the operative positions of the arms, the outer support wheels being supported by the frame in the inoperative positions of the support arms. Hoppers for dispensing granular material are mounted on the frame and on the support arms.

12 Claims, 14 Drawing Figures

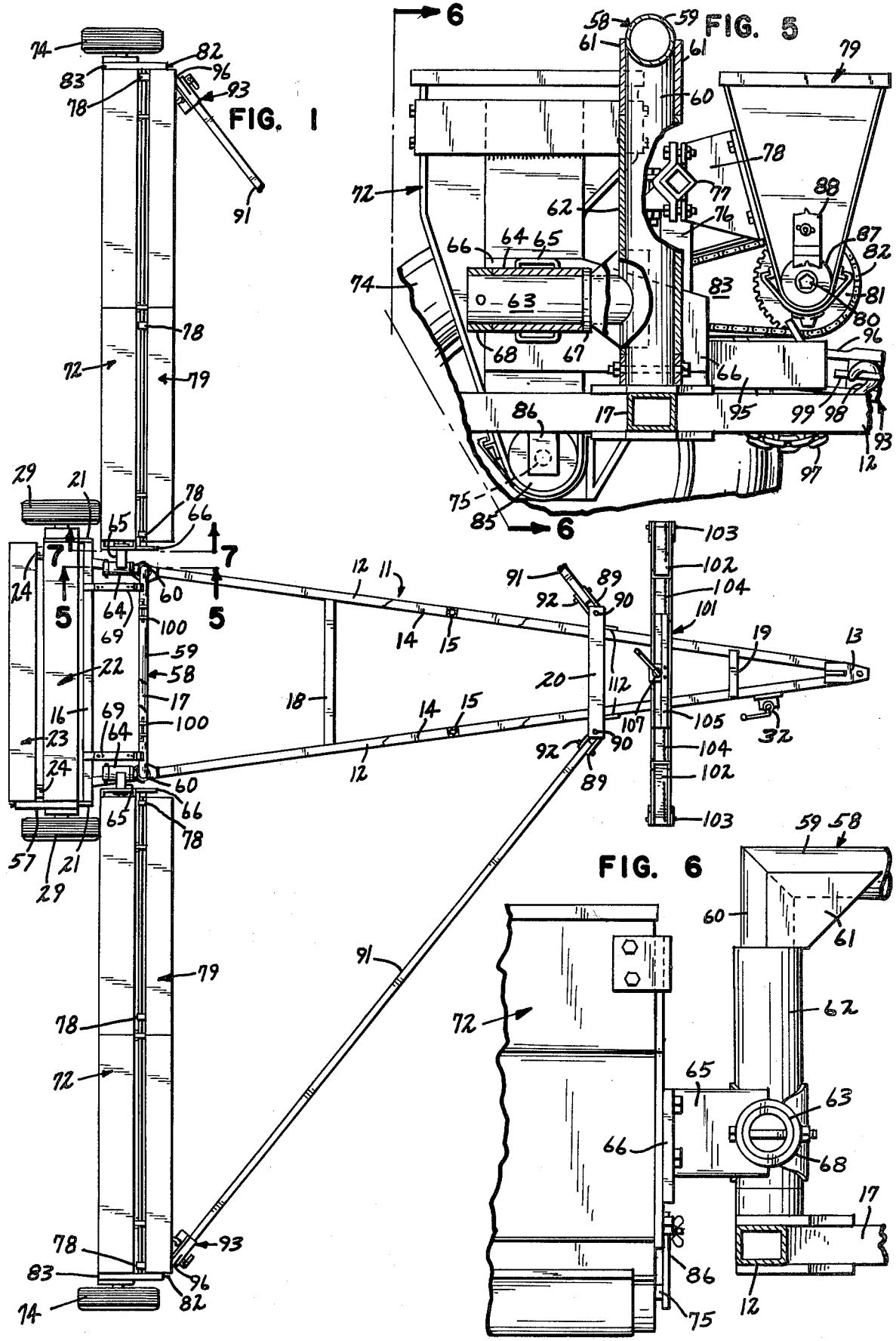

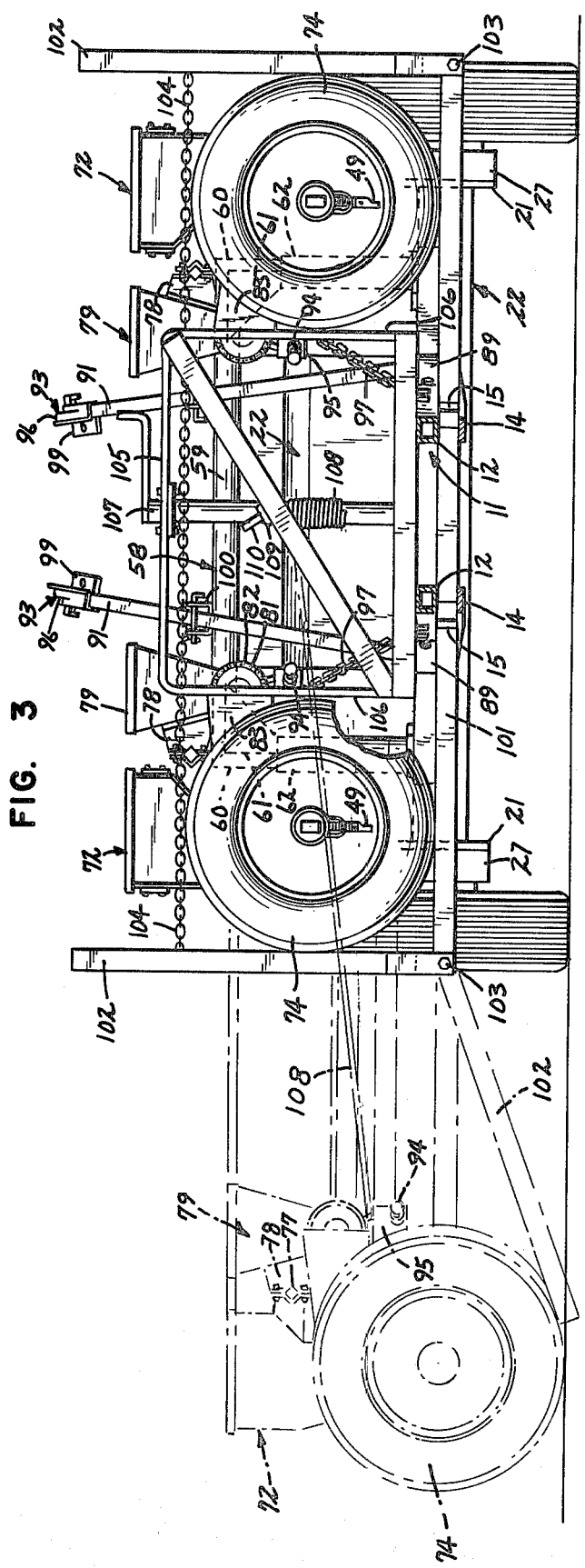

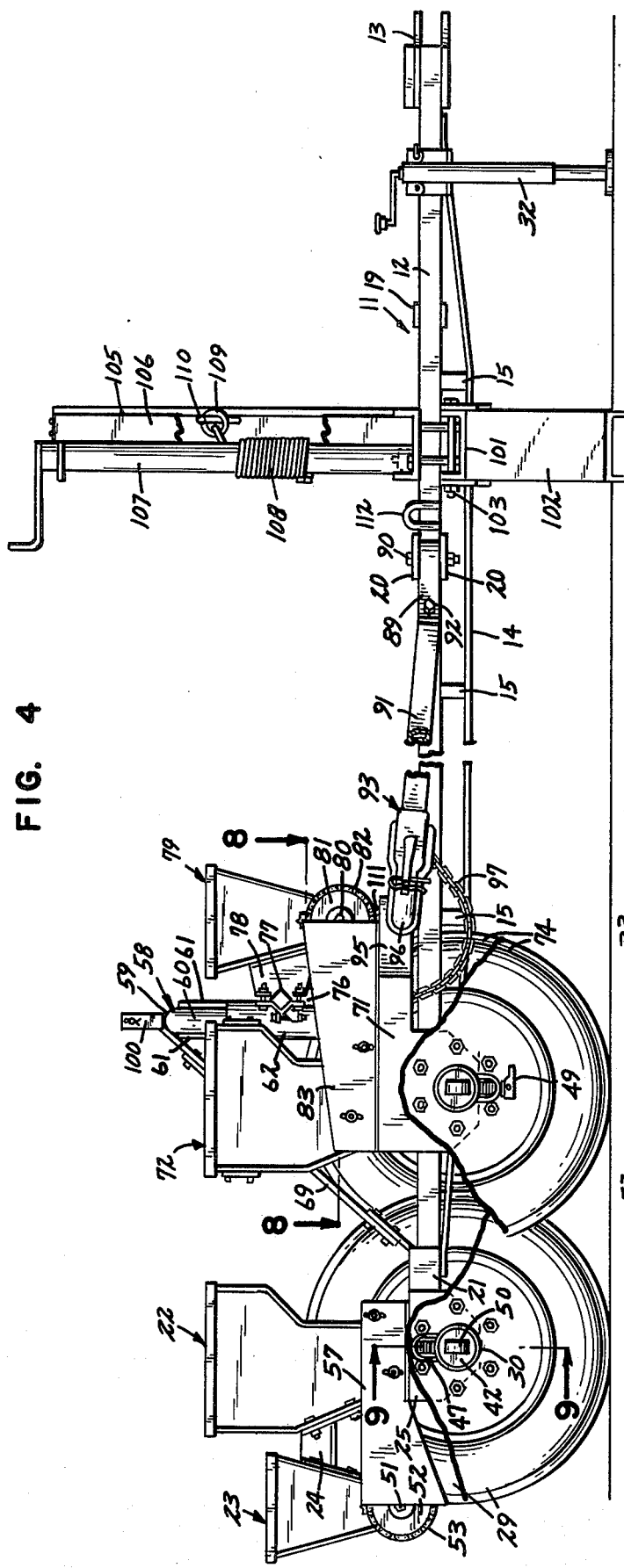

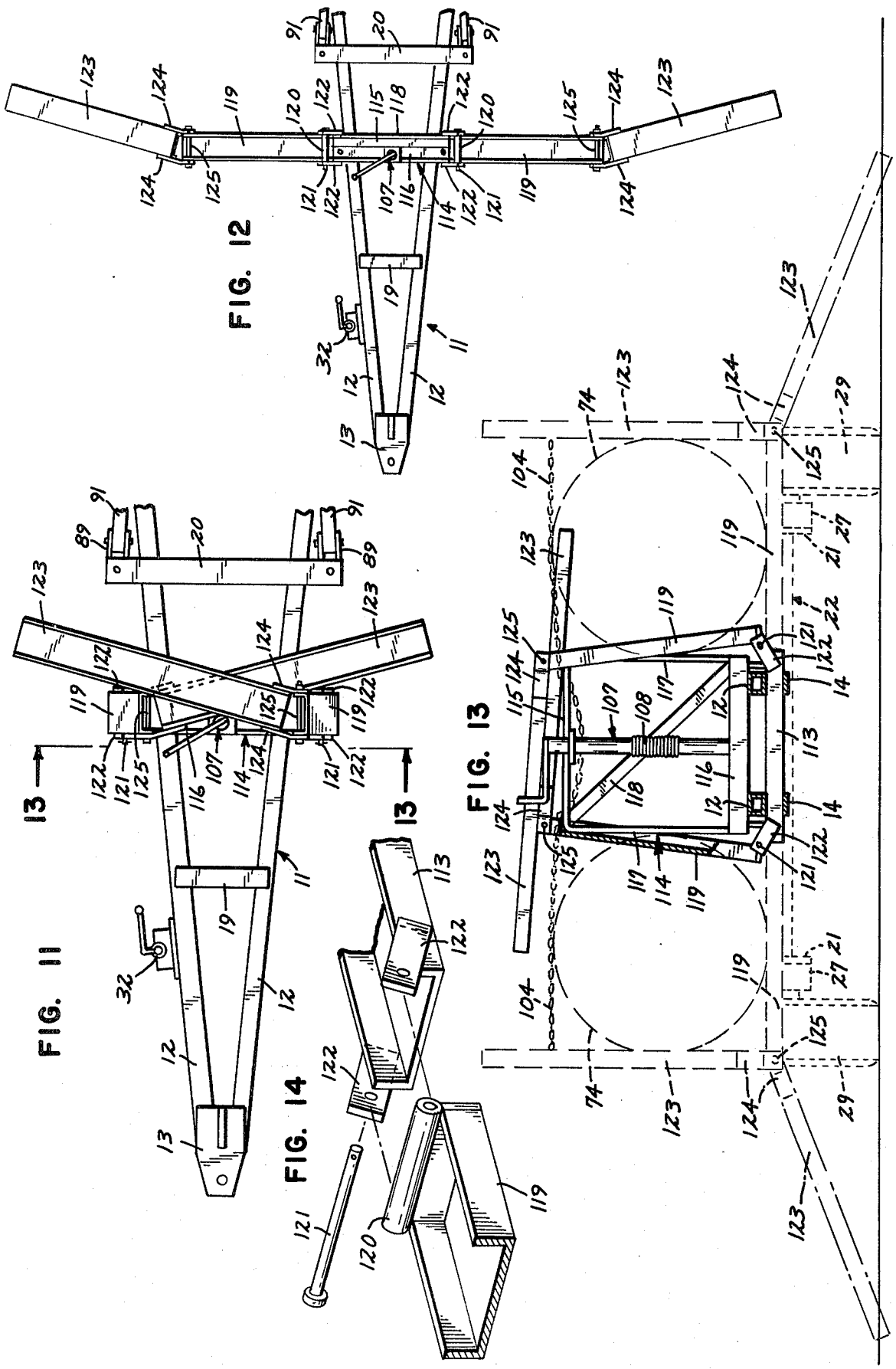

4,172,537

SPREADER FOR GRANULAR FERTILIZER AND CHEMICALS

BACKGROUND OF THE INVENTION

This invention relates generally to agricultural implements, and more particularly to implements for applying granular material, such as fertilizer or pesticides in granular form, to vegetation or to the ground. This invention is in the nature of an improvement over such implements as are disclosed in prior U.S. Pat. Nos. 2,558,352; 2,759,637; 2,929,634; and 4,008,833; and comprises a structure that, in operation, is able to cover a wide area during traverse over the ground; and which, when folded for transport or storage, occupies a minimum of space both longitudinally and transversely of the machine.

SUMMARY OF THE INVENTION

The applicator for granular material of this invention involves an elongated central frame having front and rear ends and means at its front end for connection to a draft vehicle, a pair of laterally spaced support wheels journaled at the rear ends of said central frame, elongated hopper means mounted on the central frame at the rear end thereof and extending transversely of the frame, and a pair of elongated mounting arms each having inner and outer ends. Means is provided for pivotally mounting the mounting arms at their inner ends each to an opposite side of the central frame on generally vertical axes and on generally horizontal axes extending transversely of the frame, for swinging movements between operative positions, wherein said arms extend transversely outwardly from opposite sides of said central frame, and forwardly extending inoperative transport positions. The applicator further includes a second pair of support wheels, means journaling said second support wheels each to the outer end of a different one of said mounting arms, other elongated hopper means supported by said mounting arms and having inner ends overlapping respective ends of said first mentioned hopper means when said mounting arms are disposed in their operative positions, and support means on said central frame near the front end thereof for supporting said mounting arms and said second support wheels upwardly spaced from the ground when said mounting arms are moved to their inoperative transport positions.

BRIEF DESCRIPTION OF THE DRAWINGS

FIG. 1 is a fragmentary view in top plan of the applicator of this invention in an operative position, some parts being broken away and some parts being shown in section;

FIG. 2 is a view corresponding to FIG. 1, but showing the applicator in a folded inoperative position for transport or storage;

FIG. 3 is an enlarged view partly in front elevation and partly in section, as seen from the line 3—3 of FIG. 2;

FIG. 4 is an enlarged fragmentary view in side elevation of the applicator in its operative position, some parts being broken away and some parts being shown in section;

FIG. 5, sheet 1, is an enlarged fragmentary section taken on the line 5—5 of FIG. 1;

FIG. 6, sheet 1, is a fragmentary view partly in rear elevation and partly in section as seen from the line 6—6 of FIG. 5;

FIG. 10 is an enlarged fragmentary section taken on the line 10—10 of FIG. 2;

FIG. 11 is a fragmentary view in top plan of a modified arrangement;

FIG. 12 is a view corresponding to FIG. 11, on a reduced scale, and showing a different position of some of the parts;

FIG. 13 is an enlarged view partly in front elevation and partly in section as seen from the line 13—13 of FIG. 11; and FIG. 14 is an exploded perspective view of a portion of the structure of FIGS. 11-13.

DETAILED DESCRIPTION OF THE PREFERRED EMBODIMENT

Figure 7:
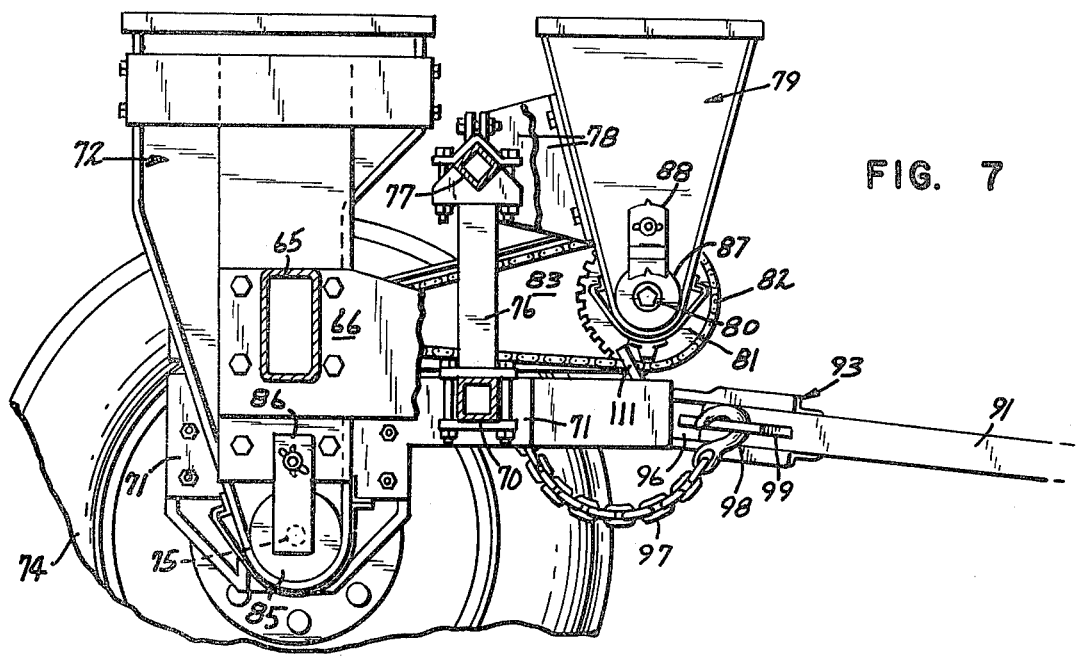
FIG. 7 is an enlarged fragmentary view partly in section and partly in side elevation, taken substantially on the line 7—7 of FIG. 1.

An elongated rigid frame is indicated in its entirety at 11, and is shown as comprising a pair of elongated side frame members 12 that converge forwardly of the direction of travel thereof to a tongue 13 that is adapted to be connected to the draw bar of a tractor or other pulling device, not shown. The side frame members 12 are stiffened by elongated tension members or struts 14 each welded at its opposite ends to opposite end portions of its respective frame member 12, and spacer members 15 welded to the frame members 12 and struts 14. The frame 11 further includes a rear cross frame member 16, intermediate cross frame members 17 and 18, a front cross frame member 19, and a pair of vertically spaced transverse bars 20 intermediate the transverse frame members 18 and 19. The transverse bars 20 as well as the frame members 12 and 16-19 are welded together to provide a rigid frame structure.

Figure 9:
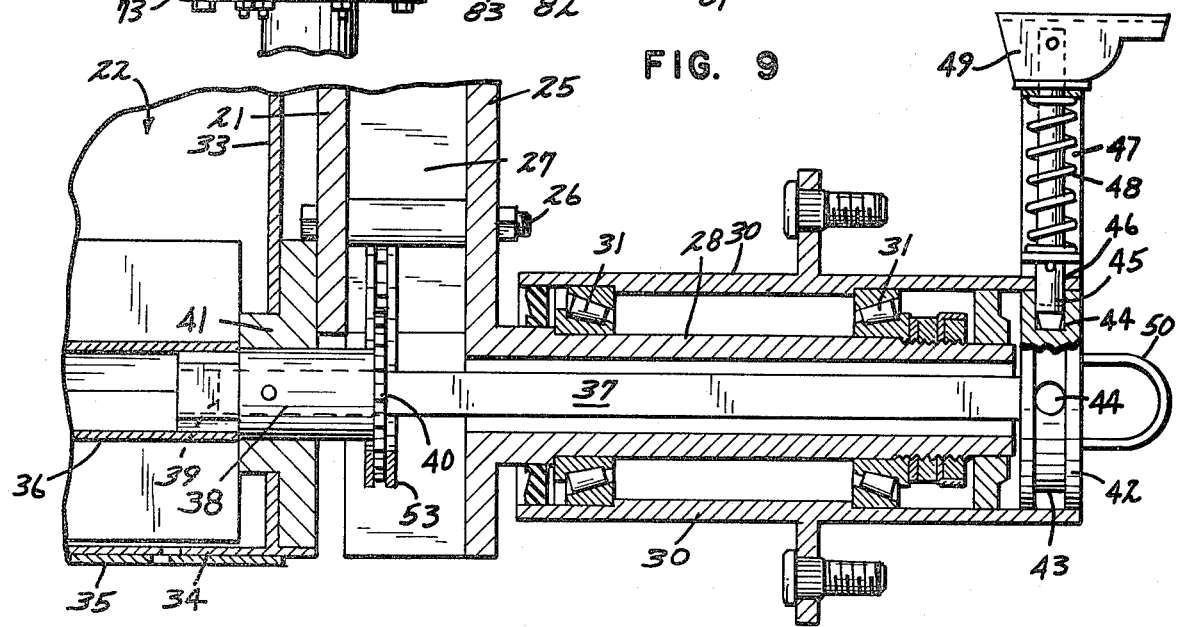
FIG. 9 is an enlarged fragmentary section taken on the line 9—9 of FIG. 4.

The rear cross frame member 16 is welded or otherwise rigidly secured to a pair of rigid plates 21 that are bolted or otherwise rigidly secured to opposite ends of an intermediate primary hopper 22 that is adapted to contain and dispense granular material. An intermediate secondary hopper 23 is rigidly mounted on the rear side of the hopper 22 by means of support brackets 24. A pair of outer plates 25 are each secured in laterally outwardly spaced parallel relationship to a respective one of the plates 21, by means of bolts 26 and spacers 27, the outer plates 25 being formed to provide axially aligned tubular axles 28, one of which is shown in FIG. 9. Ground engaging tire equipped inner or rear wheels 29 are bolted on tubular hubs 30 that are journaled on the axles 28 by means of rolling friction bearings 31, also as shown in FIG. 9. As shown, the inner wheels 29 support the rear end of the frame 11, the front end being supported by a tractor or other pulling device during operation of the machine. When the frame 11 is disconnected from the pulling vehicle, the front end is supported by a conventional jack 32, see FIGS. 1, 2 and 4.

The hoppers 22 and 23 are of the type disclosed in the prior Gandrud patents, above identified, having perforated bottom portions, perforated metering plates cooperating with the bottom portions to control dispensing of granular material from the hoppers, and rotary agitators or feeding bars. In FIG. 9, the hopper 22 is fragmentarily shown as having an end wall 33, a perforated bottom wall 34, a metering plate 35 and a rotary agitator or feeding bar 36, the rotary bar 36 being axially aligned with the aligned axles 28. The rotary bar 36 is driven from one of the wheels 29 by a shaft 37 that extends through a hub 30, the shaft 37 having its inner end 39 disposed in driving engagement with one end of the rotary bar 36. A sprocket wheel 40 has a journal portion 38 rotatably mounted in a bearing 41 in the end wall 33 of the hopper 22 and fixed to the shaft 37. The outer end of the shaft 37 is provided with a diametrically enlarged head 42 that defines a circumferential channel 43 and a plurality of holes or recesses 44 that extend radially inwardly from the bottom of the channel 43. A clutch pin 45 extends radially with respect to the hub 30, as shown in FIG. 9, through an opening 46 in the hub 30 and through the outer end of a bracket 47 rigidly secured to the hub 30. The clutch pin 45 is yieldingly urged toward engagement of the inner end thereof in one of the recesses 44 by a coil compression spring 48, and can be withdrawn from a recess 44 and from the channel 43 by means of a cam acting control member 49. Another handle 50, mounted on the outer end 42 of the shaft 37 permits the shaft 37 to be axially moved out of engagement with the rotor bar 36, when the clutch pin 45 is withdrawn from the channel 43. With the clutch pin 45 moved into one of the recesses 44, the rotor bar 36 is operatively coupled to one of the wheels 29, to be rotated therewith. Although not shown, it will be understood that only one of the heads 42 associated with the wheels 29 is provided with the holes or recesses 44.

Although not shown, it should be understood that the hopper 23 is provided with an agitator or rotor bar similar to the rotor bar 36 and having an end portion 51 journaled in a bearing in the end wall of the hopper 23, see FIG. 10. A sprocket wheel 52 is mounted on the end portion 51 and is driven from the sprocket wheel 40 by an endless link chain 53 that is entrained over the sprocket wheels 40 and 52 and over a pair of idler sprocket wheels 54 journaled on shafts 55 projecting outwardly from a mounting plate 56 fast on the adjacent end of the hopper 22. A shield 57 cooperates with the plates 21 and 25 in covering most of the link chain 53.

The frame 11 includes an inverted U-shaped structure 58 which comprises a transverse horizontal tubular beam 59 that overlies the transverse frame member 17, see FIG. 5, and a pair of vertical legs 60 each of which is secured at its lower end to a different one of the side frame members 12 adjacent opposite ends of the cross frame member 17. The opposite end portions of the beam 59 and upper ends of the legs 60 are connected and reinforced by gussets 61. Each of the legs 60 has rotatively mounted thereon a tubular sleeve 62 on each of which is mounted one of a pair of horizontally disposed tubular shafts 63. Each of the shafts 63 has telescopically rotatively mounted thereon one of a pair of tubular members 64 that is welded or otherwise rigidly secured to one of a pair of arms 65 that extend outwardly from mounting plates 66, the tubular members 64 being held against axial movement on their respective shafts 63 by flanges 67 on the shafts 63 and collars 68 bolted or otherwise rigidly secured to the free ends of the shafts 63. The inverted U-shaped structure 58 is rigidly held in its inverted position by a pair of laterally spaced brace members 69 that are rigidly secured at their lower ends to the rear cross frame member 16 and at their upper ends to the transverse tubular beam 59, see FIGS. 1, 2 and 4.

Figure 8:
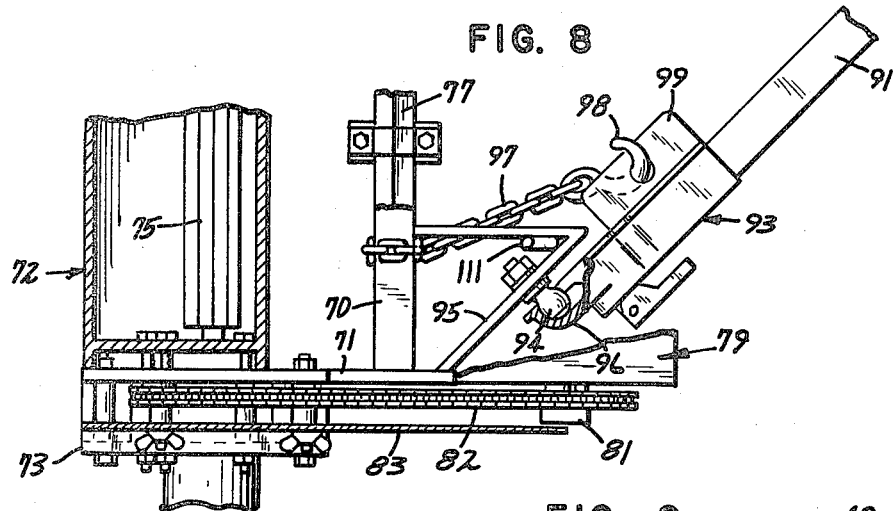
FIG. 8 is an enlarged fragmentary view in section taken on the line 8—8 of FIG. 4.

The plates 66 are rigidly secured each to the inner end of a different one of a pair of elongated mounting arms 70, the outer ends of the mounting arms 70 being welded or otherwise rigidly secured to other plates 71 similar to the plates 66. The plates 66 are bolted to the inner ends of elongated hoppers 72, the plates 71 being bolted to the outer ends of their respective hoppers 72. The plates 71 are similar in function to the plates 21, and have outer plates 73 secured thereto in outwardly spaced relationship therefrom. While not specifically shown, it may be assumed that the outer plates 73 journal outer support wheels 74 in the manner illustrated in FIG. 9, for imparting driving rotation to rotor bars 75, one of which is fragmentarily shown in FIG. 8. As shown in FIGS. 3 and 4, the outer wheels 74 are provided with control handles 49 whereby the wheels 74 may be permitted to rotate independently of their respective rotor bars 75.

Each of the mounting arms 70 is provided with a plurality of upstanding legs 76 that support tool bars 77 that are disposed in upwardly spaced parallel relation to their respective support arms 70. Each of the tool bars 77 has secured thereto a plurality of longitudinally spaced brackets 78 to which are secured secondary hoppers 79 which may be assumed to be similar in structure to the secondary hopper 23. The secondary hoppers 79 are provided with rotary bars having end portions 80, the end portions 80 having rigidly mounted thereon sprocket wheels 81 having endless link chains 82 entrained thereover and which may be assumed to be driven from their respective outer wheels 74 in a manner similar to that shown in FIG. 10. The chains 82 and idler sprockets, not shown, are at least partially covered by shields 83. In FIGS. 5 and 7, the inner ends of the rotor bars 75 are shown as being journaled in bearings 85 removably held in place by brackets or clips 86. In like manner, the rotor bar shafts 80 are journaled in bearings 87 mounted in the end walls of the hoppers 79 and releasably held in place by retainer clips 88.

The pivotal mounting of the tubular sleeves 62 on the legs 60 permit the mounting arms 70 and hoppers 72 and 79 thereof to be moved between operative positions shown in FIG. 1, wherein the inner ends of the hoppers 72 and 79 are disposed slightly forwardly of the hopper 22 and substantially in overlapping relationship to the opposite ends of the hoppers 22 and 23; and inoperative folded positions as shown in FIGS. 2 and 3, wherein the mounting arms 70 and hoppers 72 and 79 extend forwardly toward the front end of the frame 11. The pivotal mounting of the tubular members 64 on the tubular shafts 63 permits the mounting arms 70 and the hoppers 72 and 79 to swing upwardly and downwardly so that they may follow the contours of the ground, as well as to permit the mounting arms 70 and hoppers 72 and 79 to be moved to their inoperative positions of FIGS. 2 and 3, as will hereinafter appear.

The opposite ends of the transverse bars 20 project laterally outwardly of the side frame members 12, and have pivotally connected thereto, on generally vertical axes, a pair of shackle-like connectors 89, by means of pivot bolts or the like 90. A pair of elongated rigid tie members 91 have inner ends that are pivotally connected each to a different one of the connectors 89, on generally horizontal axes, by means of pivot bolts 92, the connectors 89, with their respective bolts 90 and 92 providing swivel joints between the transverse bars 20 and the tie members 91. The longitudinally outer ends of the tie members 91 are releasably secured to the outer end portions of respective ones of the mounting arms 70 by commercially available hitches indicated generally at 93, each of the hitches 93 comprising a ball member 94 mounted on a bracket 95 that is welded or otherwise rigidly secured to the outer end portion of a respective one of the mounting arms 70 and its respective plate 71, and a socket 96 mounted on the outer end of its respective tie member 91, see particularly FIG. 8. As therein shown, a safety chain 97 is secured to the outer end portion of each mounting arm 70, and is provided with a hook 98 for engagement with a perforated flange 99 on a portion of the socket 96. The swivel joint connections at the inner ends of the tie members 91 and the ball hitches 93 connecting the outer ends thereof to the mounting arms 70 permit upward and downward movement of the outer ends of the mounting arms 70 and hoppers carried thereby; and further permit the tie members 91 to be moved to a storage position as shown in FIGS. 2 and 3, wherein the tie members 91 may be retained in shackles 100 that are secured to the transverse tubular beam 59.

For the purpose of supporting the mounting arms 70, with their respective hoppers 72 and 79, and their respective outer support wheels 74 in the inoperative storage positions thereof, an elongated transverse support beam 101 is mounted on the frame 11 between the transverse bars 20 and the front cross frame member 19, and between the side frame members 12 and struts 14, see particularly FIGS. 3 and 4. The support beam 101 is preferably made from commercial channel iron, and has pivotally connected to its opposite ends the inner ends of a pair of ramp members 102, by bolts 103. The ramp members 102 are movable between lowered ramp forming positions, as shown in FIG. 4 and by broken lines in FIG. 3, and upwardly extending wheel retaining positions as shown in FIG. 2 and by full lines in FIG. 3. The ramp members are releasably secured in their upwardly extending wheel retaining positions by means of a link chain 104. Preferably, the ramp members 102, like the support beam 101, are made from commercial channel iron.

A generally rectangular framework 105 extends transversely of the frame 11 in overlying relationship to the support beam 101, and includes a pair of vertically disposed legs 106. A crank operated winch 107 is journaled in the framework 105, and has wound thereon a flexible cable 108 the free end of which terminates in a ring 109. When the winch is not used, the ring 109 has hooking engagement with a pin 110 on the framework 105, see particularly FIG. 4.

When it is desired to dispose the applicator of this invention in its inoperative arrangement for transit or storage, the hooks 98 are disengaged from the flanges 99, and the sockets 96 are disengaged from the hitch balls 94. The tie members 91 are then moved to their positions of FIGS. 2 and 3, and locked into the shackles 100. The prime mover is then operated to move the applicator in a rearward direction, whereby to cause the mounting arms 70 and parts carried thereby to swing forwardly and inwardly toward the frame 11. When the outer support wheels 74 approach the opposite ends of the support beam 101, the rearward movement of the applicator is terminated, and the ramp members 102 are lowered into their ramp forming positions of FIG. 4 and as shown by broken lines in FIG. 3. Cable 108 is then unreeled from the winch 107, and the ring 109 is placed into hooking engagement with one of a pair of pins 111, each pin 111 being welded or otherwise rigidly secured to a different one of the brackets 95. The winch is then operated to cause the engaged mounting arm 70 to be moved laterally inwardly about the axis of its respective tubular sleeve 62 so that its respective outer support wheel 74 moves up the ramp member 102 and into abutting engagement with an adjacent one of the legs 106, as shown by broken and full lines in FIG. 3. It will here be noted that, when the support wheel 74 moves up the ramp member 102, its respective mounting arm 70 will swing upwardly about the axis of its respective tubular shaft 63 and tubular member 64. When one of the mounting arms 70 and its related equipment is thus loaded on the support beam 101, its respective ramp member 102 is pivotally moved upwardly to engage the wheel 74, and is secured to one end of the chain 104. The ring 109 is secured to the pin 111 of the other mounting arm 70, and the process is repeated to load the other mounting arm 70 and its related parts. The other ramp member 102 is then moved to its full line position of FIG. 3 and held in this position by the other end of the chain 104. The legs 106 limit laterally inward movement of the wheels 74, and the hooks 98 of the chains 97 are caused to engage loop members 112 mounted on the side frame members 12 to further hold the mounting arm and hopper assemblies against movement laterally outwardly of the frame 11.

In disposing the applicator of this invention from its storage or transport mode to its operating mode, it is only necessary to lower the ramp members 102 into engagement with the ground, unhook the chains 97 from the loops 112, and manually roll the hopper assemblies down the ramp members 102, so that they will swing toward their operative positions of FIG. 1. In the event that the hoppers 72 and 79 have a substantial amount of material therein, rendering the assemblies fairly heavy, rearward swinging of the mounting arms 70 and their associated parts to their full operative positions, can be accomplished by imparting forward movement to the applicator. When the mounting arms 70 are disposed in their operative positions, it is only necessary to connect the tie members 91 to the brackets 95 and hook the chains 97 to their respective flanges 99, after which the ramp members 102 are raised out of engagement with the ground and operation of the applicator may be initiated.

MODIFICATION OF FIGS. 11-14

This form of the invention involves a different arrangement of support means for the outer support wheels 74. The central frame in the modified arrangement is identical to the frame 11, and the parts thereof carry the same reference numerals as those of corresponding parts shown in FIGS. 1-10.

A support beam 113 similar to the support beam 101, but substantially shorter than the beam 101, extends transversely of the frame 11 and is rigidly secured to the frame members 12, therebetween and the underlying struts 14. A generally rectangular framework 114, similar to the framework 105, overlies the beam 113 and includes top and bottom transverse members 115 and 116 respectively, laterally spaced generally vertical stop members in the nature of legs 117 similar to the legs 105, and a diagonal brace 118. As shown, the framework 114 supports a winch 107.

A pair of elongated beam extension members 119 are preferably made from commercial channel iron, and have inner ends provided with hinge elements 120 for reception of generally horizontally extending pintles 121 that extend through other plate-like hinge elements 122 welded to the beam 113 at its opposite ends. The hinge structure 120-122 is such that the extension members 119 are pivotally movable between upwardly extending storage positions in engagement with respective ones of the legs 117 and generally horizontal operative wheel supporting positions, see particularly FIG. 14. The inner ends of the extension member 119 abuttingly engage respective ends of the beam 113 to limit downward swinging movement of the members 119 below generally horizontal positions.

A pair of elongated ramp members have inner ends provided with angular hinge elements 124 that receive pintles 125 extending transversely through the outer end portions of the extension members 119 on generally horizontal axes, to mount the ramp members 123 for pivotal movements relative to respective ones of the extension members 119. The ramp members 123 are pivotally movable between ramp forming positions wherein their outer ends engage the ground, as shown by dot and dash lines in FIG. 13; folded generally vertical positions for holding the support wheels 74 against the legs 117, as shown by dash lines in FIG. 13; and folded storage positions in overlying relation to the top member 115 and one to another, as shown by full lines in FIG. 13 and in FIG. 11.

The angularity of the hinge elements 124 disposes the ramp members 123 in angularly displaced rearwardly diverging relation, as seen from above, when the ramp members 123 are moved to their operative positions, see FIG. 12. Thus, the support wheels 74 are adequately supported during their movement in arcuate paths on the ramp members 123 toward and away from their storage positions on the extension members 119. It will be appreciated that, when the members 119 and 123 are disposed in their folded positions shown in FIG. 11 and by full lines in FIG. 13, a tractor, not shown, pulling the apparatus over a field, can make a very sharp turn without having a rear wheel thereof touching any portion of the members 113, 119, or 123. In the arrangement illustrated in FIGS. 1-10, a tractor is somewhat limited in its steering movement by engagement of either of its rear wheels with a respective one of the outer ends of the support beam 101.

While preferred and modified forms of applicator have been shown and described, it will be understood that the same is capable of further modification, and that such further modification may be made without departure from the spirit and scope of the invention as defined in the claims.

What is claimed is:
1. An applicator for granular material comprising:
 (a) an elongated central frame having front and rear ends and means at its front end for connection to a draft vehicle;
 (b) a pair of laterally spaced support wheels journaled at the rear end of said central frame;
 (c) elongated hopper means mounted on said central frame at the rear end thereof and extending transversely of said frame;
 (d) a pair of elongated mounting arms each having inner and outer ends;
 (e) means pivotally mounting said mounting arms at their inner ends each to a respective side of said central frame on generally vertical axes and on generally horizontal axes extending transversely of said arms, for swinging movements between operative positions, wherein said arms extend transversely outwardly from opposite sides of said central frame, and forwardly extending inoperative transport positions;
 (f) a second pair of support wheels;
 (g) means journaling said second support wheels each to the other end of a different one of said mounting arms;
 (h) other elongated hopper means supported by said mounting arms and having inner ends overlapping respective ends of said first mentioned hopper means when said mounting arms are disposed in their operative positions;
 (i) and support means on said central frame near the front end thereof for supporting said mounting arms and said second support wheels upwardly spaced from the ground when said mounting arms are moved to their inoperative transport positions.

2. The applicator defined in claim 1 in which said second pair of wheels comprises fixed bearings extending longitudinally outwardly of the outer ends of said mounting arms.

3. The applicator defined in claim 1 in which each of said hopper means comprises a pair of hoppers in side-by-side relationship, further including rotary agitator shafts for each of said hoppers, and drive means operatively coupled to given ones of said support wheels and respective ones of said agitator shafts for rotating said agitator shafts responsive to rotation of said support wheels.

4. The applicator defined in claim 1, further including a pair of elongated rigid tie members having inner and outer ends, swivel joints connecting each of said tie members at its inner end to a different side of said frame near said front end thereof, and swivel mechanisms connecting the outer ends of said tie members each to the outer end of a different one of said mounting arms.

5. The applicator defined in claim 4 in which each of said swivel mechanisms comprises a ball member and a socket one on a respective one of said mounting arms and the other on a respective one of said tie members.

6. The applicator defined in claim 1 in which said support means comprises a support beam extending transversely of said frame and defining a track for reception of said second support wheels.

7. An applicator for granular material comprising:
 (a) an elongated central frame having front and rear ends and including a pair of side frame members joined together at said front end and diverging rearwardly, a rear cross frame member, and at least one intermediate cross frame member;
 (b) a pair of laterally spaced support wheels journaled on said frame adjacent said rear frame member;
 (c) elongated hopper means mounted on said frame adjacent said rear cross frame member and extending transversely of said frame;
 (d) a pair of elongated rigid mounting arms having inner and outer ends;
 (e) means pivotally mounting the inner ends of said mounting arms each to a respective side of said frame forwardly of said hopper means and on generally vertical axes and on generally horizontal axes for swinging movements between operative positions wherein said arms extend transversely outwardly from said frame, and forwardly extending inoperative transport positions;

(f) a second pair of said support wheels one each journaled on the outer end of a different one of said mounting arms;

(g) other elongated hopper means supported by said mounting arms and having inner ends overlapping respective ends of said first mentioned hopper means when said mounting arms are disposed in their operative positions;

(h) and support means on said central frame near the front end thereof for supporting said mounting arms and said second support wheels upwardly spaced from the ground when said mounting arms are moved to their inoperative transport positions.

8. The applicator defined in claim 7 in which said support means comprises a transverse support beam on said frame near the front end thereof and defining a track for supporting engagement with the support wheels of said second pair thereof.

9. The applicator defined in claim 8 further including a pair of elongated ramp members having inner ends each pivotally secured to a different end of said transverse support beam for pivotal movements between lowered positions sloping laterally outwardly and downwardly from said support beam and raised wheel retaining positions projecting upwardly from said support beam.

10. The applicator defined in claim 9 further including a pair of laterally spaced stop members on said support means limiting movement of the support wheels of said second pair toward each other on said support beam, and hoist means on said support means for moving the outer ends of said support arms and second pair of wheels laterally inwardly and upwardly from the ground on said ramp members when said ramp members are in said lowered positions thereof.

11. The applicator defined in claim 1 in which said support means comprises:
(a) a transverse beam on said frame near the front end thereof;
(b) a pair of beam extension members having inner ends each pivotally secured to a different end of said transverse beam for swinging movements of said extension members between generally horizontal wheel supporting positions and upwardly extending generally vertical storage positions, and outer ends; and
(c) a pair of elongated ramp members each having an inner end pivotally secured to the outer end of a different one of said beam extension members for swinging movements of said ramp members on generally horizontal axes relative to said beam extension members.

12. The applicator defined in claim 11, further comprising a framework extending upwardly from said transverse beam and including a pair of laterally spaced stop members limiting movement of the support wheels of said second pair toward each other when said mounting arms are moved to their said inoperative positions, said extension members being pivotally movable into engagement with respective ones of said stop members when said second pair of support wheels are removed from said support means, said ramp members being pivotally movable into generally overlying relationship to said framework.

* * * * *